Oct. 4, 1932.  J. W. BRYCE  1,880,410
AUTOMATIC CONTROL SYSTEM FOR TABULATORS
Filed Sept. 28, 1927   5 Sheets-Sheet 1

Patented Oct. 4, 1932

1,880,410

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

AUTOMATIC CONTROL SYSTEM FOR TABULATORS

Application filed September 28, 1927. Serial No. 222,466.

The invention concerns an automatic control system for record controlled accounting machines particularly those of the electrically operated type.

Electrically controlled tabulators operate to take data, usually represented by differentially located perforations in control cards, from the cards and enter them into accumulating or printing mechanism. The meaning of the data represented on the cards is fixed by the differential locations of the perforations, and the usual scheme of operation is to provide an analyzing device which closes an electric circuit through any perforation which it may encounter on a card to initiate a current impulse, differentially timed in accordance with the location of the perforation causing it to effect operation of the accumulating or printing mechanism. The data which thus enter into computing operations are placed in certain definite card columns, one column being provided for each figure in a numerical item.

In addition to the usual amount designations on the cards, certain classification data are also entered which represent the class or group to which the card belongs. The purpose of these classification perforations is to automatically control machine operation so that each group may be accumulated and totaled individually. The classification data are not ordinarily accumulated and certain card columns are set aside for them, the machine control being effected from those columns. The cards are sorted into groups bearing like classification data, and pass through the machine successively, and in passing one card passes a given analyzing mechanism, while the following card is passing another analyzing mechanism. As long as the classification data of successive cards agree, one or a plurality of control circuits is energized to maintain the machine in operation, and another card feeds. As soon as the classification designations on succeeding records disagree, the control circuit or circuits fail to energize, and the machine stops or takes a total of the data from the card group which has just passed.

The invention contemplates such an automatic control system for controlling machine operation in accordance with selected card groups of improved and surer operation and simplification of construction. Heretofore, the most common type of electrical automatic control system consists of upper and lower brushes which are connected in series between the main supply lines of the machine, the series circuit containing electromagnetic devices for governing machine operation in accordance with the different card groups. The series connection of brushes requires that they be of different electrical polarity and consequently only one set, that is the lower set, has been available for controlling the accounting mechanism. In modern developments, it is often very desirable to enter items into the accumulating mechanism either from the upper or lower brushes and this requires upper and lower brushes of the same polarity. It is therefore a prime object of the invention, to provide an automatic control system for a machine having upper and lower analyzing brushes in which the brushes may be made of the same electrical polarity.

Certain systems of automatic control have been suggested in which the upper and lower brushes are of the same polarity; but these systems, so far as the applicant is aware, depend for their operation on balanced and unbalanced conditions in certain controlling circuits. If the current conditions in the circuits are balanced, for example, the machine continues operation and cards feed, while if the current conditions are unbalanced the machine either stops or takes a total. According to the present invention the operation of the system does not depend on either electrical or magnet balance, but merely on whether certain circuits are energized or de-energized.

The invention contemplates a plurality of series of magnets, preferably with four in each series, one series being connected through a commutator mechanism to the upper brushes of the machine and the other series being connected through a commutator to the lower brushes of the machine. The commutators are arranged to energize corresponding magnets in the two series whenever the classification perforations on the cards under the upper and lower brushes agree, and to energize non-corresponding magnets in the series when the perforations disagree. The magnets operate in pairs upon a common switch mechanism, one of each pair acting on a separate switch element to close the switch mechanism as long as both magnets of the pair are energized or both are deenergized. The several switching mechanisms are connected in series in the usual control circuit of the machine. Obviously this circuit remains closed to continue machine operation and card feed in the usual manner as long as the magnets in the several pairs agree in their energization status, which will be the case as long as the classification data on cards under the upper and lower brushes agree. When the classification data disagree, one or more pairs of magnets will fail to maintain their switching mechanism closed, thus opening the control circuit to interrupt machine operation at the end of a card cycle.

A further object of the invention is to provide a control system consisting of a series of magnets associated with each upper and lower control mechanism.

A further object of the invention is to provide a commutator device cooperating with a controlling card to energize one or a plurality of a series of magnets in accordance with each character designation which may occur on the card.

These and other objects, which will be particularly pointed out as the description proceeds, will be clear from the following detail description which should be read in connection with the accompanying drawings in which the same reference characters refer to the same parts throughout the several views, and in which:

Fig. 1a should be placed below Fig. 1 to form a complete circuit diagram.

Figure 1:
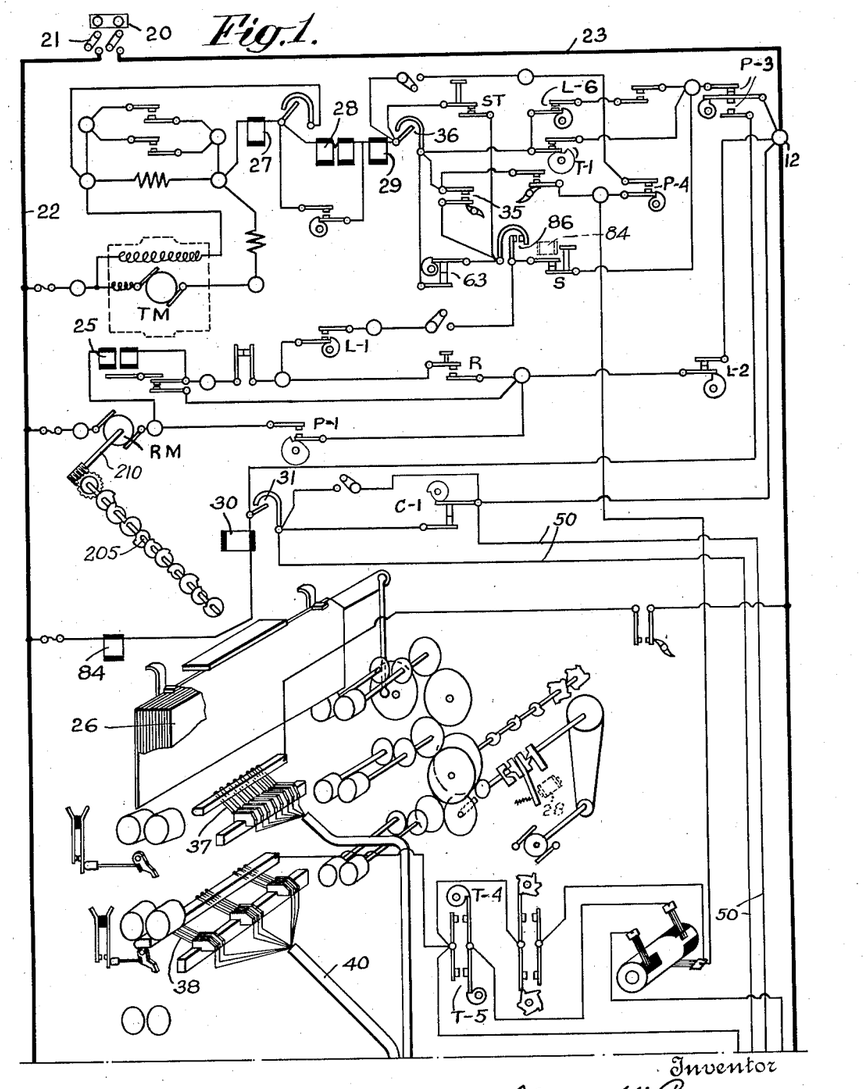
Figs. 1 and 1a in combination, illustrate a circuit diagram of a machine equipped with an automatic control system according to the invention.

Referring first to Fig. 1, a complete diagram of the machine is shown which, with the exception of the control system, is similar to that disclosed in the patent to Daly and Page, No. 1,762,145, issued June 10, 1930. The operation of this circuit diagram and a complete machine associated with it are fully described in that patent and will be briefly described in the present case. The diagram differs from that in the patent only in that the upper analyzing brushes are of the same polarity as the lower brushes, and the former control mechanism has been replaced by one constructed according to the present invention.

The machine is energized from a source of energy indicated diagrammatically at 20 which is connected by a double pole switch 21 to lines 22 and 23 from which the power is delivered to the several operating circuits of the machine. During accumulating and listing operations the machine is driven by the tabulating motor TM and during totaling and reset operations the machine is driven by the reset motor RM. Before starting a tabulating operation it is customary to clear the counter elements of the machine of any data which may be standing on them from a previous operation. This is effected by closing the reset contacts R which energize the reset motor RM in series with the usual reset clutch magnet 25 through the reset contacts R and normally closed cam contacts L—2. Directly after the reset cycle starts, the cam contacts P—1 close, shortcircuiting the clutch magnet 25, thereupon causing the reset clutch to disengage after a single revolution. The contact P—1 opens toward the end of the reset cycle to stop the reset motor RM at the end of the cycle. This single cycle of operation clears the counters and leaves them in readiness for a tabulating operation.

After the control cards indicated at 26 have been placed in the card magazine, tabulating may be started by closing the start key ST, whereupon the tabulating motor TM is energized through a circuit extending from the line 22 through the armature of the motor and starting relay 27, card feed clutch magnet 28, motor relay magnet 29, start key contacts ST and through motor control relay contacts 86, emergency stop key S and contacts P—3 to the other side of the line 23. The motor control relay contacts 86 are normally open and serve to prevent starting of tabulating unless the machine has previously been sent through a resetting cycle. Toward the end of the resetting cycle the lower cam contacts P—3 are operated by a cam on the resetting shaft 205 to close momentarily and establish a circuit from line 22 to the motor control relay coil 84 and stick relay 30 to lower cam contacts P—3 thence to the other side of the line 23. The energization of the motor relay coil 84 closes the contacts 86 in readiness for beginning a tabulating operation; and when this coil is once energized, a stick circuit is prepared, extending from the contacts 31 of stick relay 30, and thence through the automatic control circuit which will be hereinafter described.

The tabulating operation having been started, the tabulating motor TM drives the mechanical elements of the machine. The card feed clutch magnet 28, as long as it remains energized, causes the cards 26 to feed from the magazine beneath the upper and lower brushes by a suitable well known picker mechanism. The start key ST may be released shortly after the motor starts, since the contacts it controls are shunted by cam contacts T—1 which close during the early part of each cycle and open toward the end of the cycle. When the first card reaches the upper brushes, card feed contacts 35 are closed and shunt the cam contacts T—1, the motor circuit now extending from the line 22 through the motor TM, start relay 27, card feed clutch magnet 28, motor relay magnet 29, motor relay contacts 36, to card lever contacts 35, thence through motor relay contacts 86, closed as long as coil 84 remains energized, to stop key S, thence through upper contacts P—3 closed when the reset motor RM is not operating, and thence to the other side of the line 23. The machine will remain in operation and continue to feed cards as long as the motor control relay coil 84 remains energized to hold the contacts 86 closed. If this coil becomes deenergized, permitting the contacts 86 to open, the operation of the tabulating motor will be interrupted at the end of the cycle by the opening of contacts T—1, these contacts being timed to stop the motor and the several machine elements in their normal home positions.

Each card feeds successively past the upper brushes 37 and the lower brushes 38 and as it passes the latter its amount perforations cause pulses of current, differentially timed in accordance with the location of the perforations, to pass from the lower brushes 38, which are energized during the adding portion of the cycle by the closure of cam contacts T—4 and T—5, through cabled connections 40 to triple sockets 41 on the plug board 42. The impulses initiated by any lower brush may be used to control any of the accumulator magnets 45 by plugging them to sockets 41 connected with the lower brushes. Total printing at the end of a card group is effected by the contacts 47 which cooperate with the accumulator element 200 to furnish a pulse of current differentially timed in accordance with the amount standing on the accumulator to the printing magnets 48 thereby energizing them through a circuit extending through the contacts NL and LP to lower cam contacts P—2 closed during the totaling cycle and switch 49 to line 23. These operations are completely described in Patent No. 1,822,594 to C. D. Lake, and the outline here given is merely for the purpose of aiding in an understanding of the automatic control system which will now be described.

It will be recalled that the machine continues to feed cards and tabulate as long as the contacts 86 remain closed, which in turn requires the energization of magnet 84. If the magnet 84 is deenergized during a card run, then the tabulating operation is interrupted, and it is the purpose of the automatic control circuit to provide for maintaining the magnet 84 energized as long as cards under the upper and lower brushes agree in their control perforations, and to provide for deenergization of this magnet as soon as the card fed to the upper brushes fails to agree in its control perforations with the card passing the lower brushes. The stick circuit prepared by energization of the stick magnet 30 extends through stick relay contacts 31 and the cam contacts C—1 to the line 23. Contacts C—1 are normally closed but are arranged to open at a certain point in each card cycle and therefore tend to deenergize the magnet 84 during each cycle. The control circuit proper, indicated at 50, forms a shunt about the cam contacts C—1 to prevent interruption of machine operation as long as the card group does not change. The circuit 50 includes in series a plurality of control contacts 51, these contacts occurring in sets of four for each card column from which control is to be effected. In the present case, four sets of contacts 51 have been illustrated on plug board 42, indicating that in the present embodiment the system may control from four card columns. Between each pair of sets of contacts 51 a socket 52 is provided and a plug 53 may be inserted in any of the sockets 52 to cut out any or all of the upper three sets of contacts, thus permitting control to be effected from one, two, three or four card columns. The contacts 51 are all normally closed and it is obvious that as long as they remain closed, the opening of the cam contact C—1 is ineffective to deenergize the magnet 84. When one set of contacts 51 opens and remains open at the time that the cam contact C—1 opens, the coil 84 is deenergized permitting the contacts 86 to open, interrupting machine operation. Each pair of contacts 51 in the upper row is controlled conjointly by one of the magnets 55 and one of the magnets 56 in a manner fully described hereinafter. The contacts remain closed as long as the related operating magnets 55 and 56 are both energized or both deenergized. The magnets 55 cooperate with a commutator mechanism 57 and the magnets 56 cooperate with the commutator mechanism 58. Hereinafter, for the sake of convenience, the commutators with their associated magnets will be referred to as translators.

Each translator mechanism is provided with a socket 60 on the plug board 42 by means of which it may be plugged to the upper or lower brushes 37, 38 of the machine.

Figure 1A:
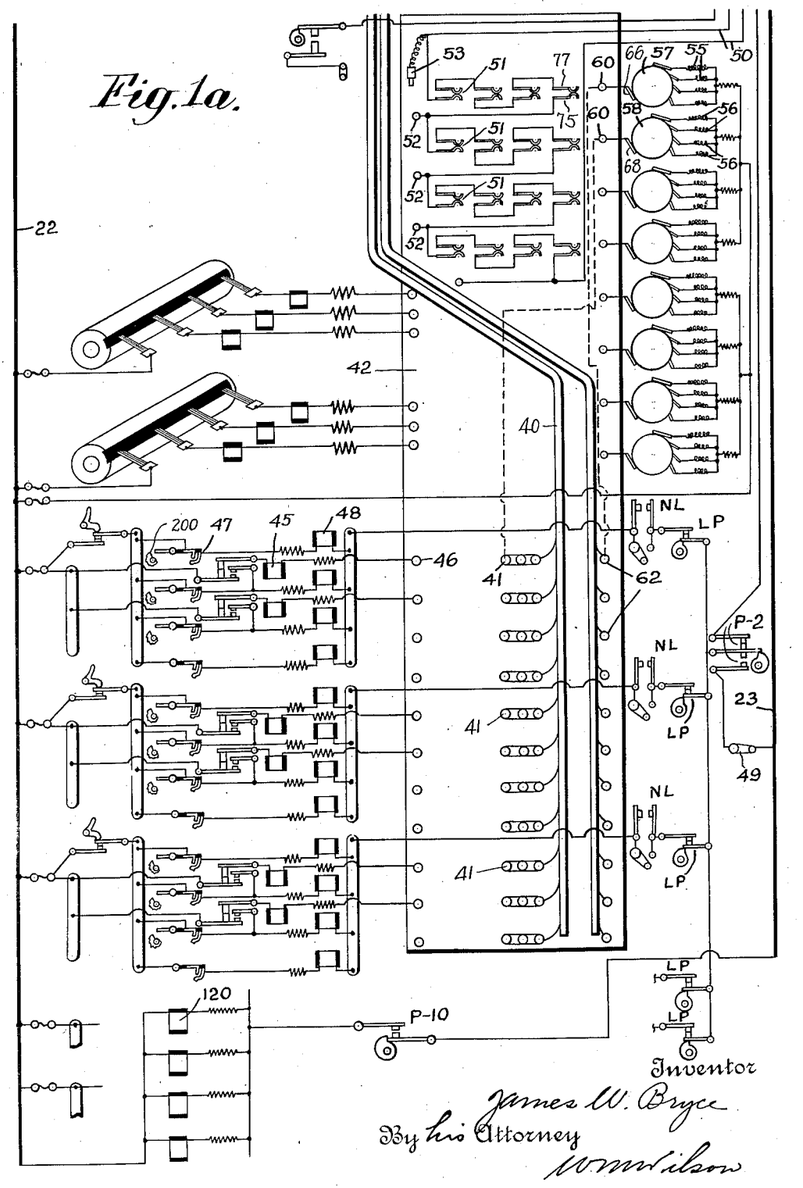

In the diagrammatic illustration Fig. 1a, the upper contacts 77 of the pairs 51 on the topmost row are controlled by the magnets 55 and the lower contacts 75 of the pairs 51 on the topmost row are controlled by the magnets 56. In practice, when it is decided to control through this topmost row from a given card column, the corresponding upper brush 37 cooperating with the selected column on the card, may be plugged from the socket 62 to the socket 60 of translator 57, and the corresponding lower brush 38 cooperating with the same column may be plugged from the socket 41 to the socket 60 of translator 58, as shown in Fig. 1a.

The operation of the translators 57 and 58 will now be explained in connection with Fig. 3. The plugging to the upper and lower brushes has connected commutator 57 through a continuous conducting strip 65 and coacting brush 66, Fig. 1a, to one of the upper brushes of the machine. Similarly the plugging of the commutator 58 has connected this commutator through a continuous conducting strip 67 and a brush 68, Fig. 1a, to the corresponding lower brush of the machine. Obviously, whenever the upper and lower brushes encounter perforations in the control cards the conducting strips 65 and 67 are momentarily energized. The conducting strip 65 is electrically connected to contact points 69 on commutator 57, and the conducting strip 67 is similarly connected to conducting spots 70 on the commutator 58. These conducting spots are arranged in four circumferential rows about the periphery of the commutator, and each row on commutator 57 coacts with a brush 71 while each row on commutator 58 coacts with a brush 72. Each brush 71 is individually connected to a magnet 55 while each brush 72 is individually connected to a magnet 56. Conducting spots 69 and 70 are similarly arranged on the commutators 57 and 58 in transverse rows, each row passes the line of reading brushes 71, 72 at a time corresponding to an analyzing point in machine operation. The commutators are rotated synchronously with each other and with the card feed of the machine so that whenever the associated analyzing brushes 37, 38 encounter perforations, the corresponding transverse rows of spots 69 and 70 will be under their respective brushes 71 and 72. Thus, when the upper brush 37 associated with the commutator 57 encounters a perforation in the nine position, the two brushes 71 to the right, Fig. 3, encounter conducting spots on the commutator 57. Similarly when the upper brush 37 encounters a perforation in the six position, the extreme right and left brushes 71 will encounter conducting spots on the commutator; from which it follows that whenever the upper brush in question encounters a perforation, one or more of the magnets 55 will be instantaneously energized. In like manner, when the lower brush 38 connected to the commutator 58 encounters a perforation, one or more of the magnets 56 will be energized. Furthermore, owing to the symmetrical arrangement of the conducting spots on the commutators 57 and 58 it is obvious that if the upper and lower brushes encounter like perforations on the cards which are passing them in a given cycle; one pair of corresponding magnets 55 and 56 will be energized while the other pairs of magnets 55 and 56 will remain deenergized.

Figure 3:
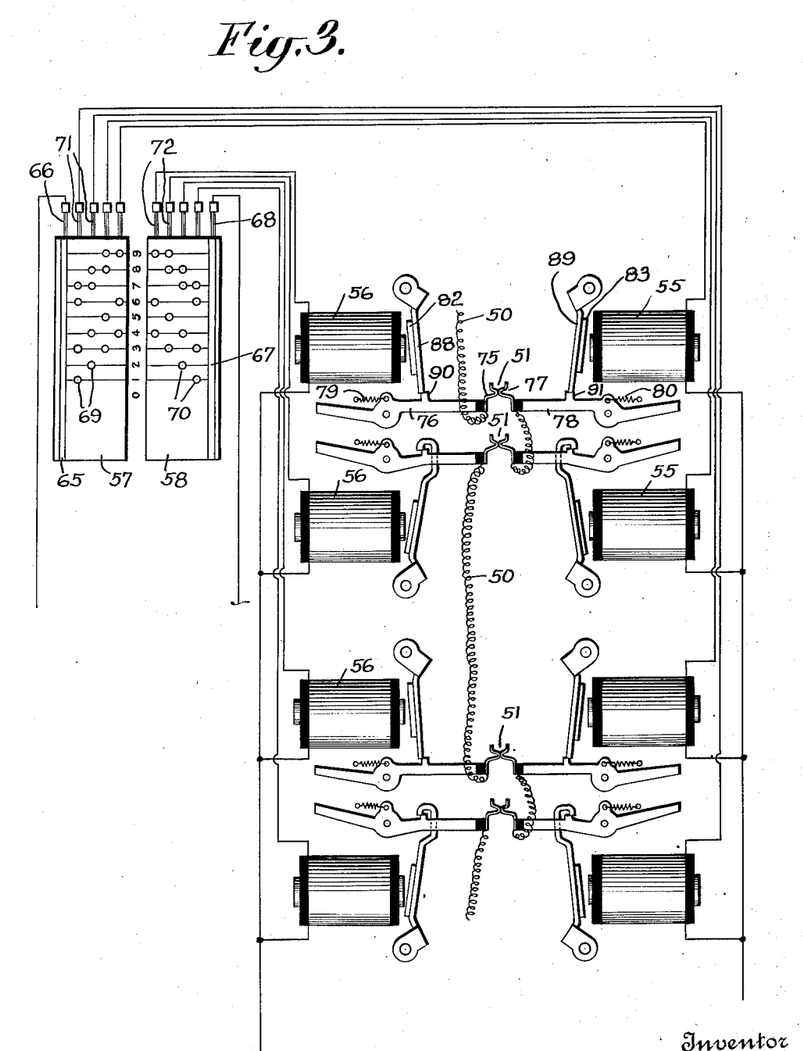
Fig. 3 is a diagram illustrating the operation of a control unit.

One magnet 55, Fig. 3, cooperates with one magnet 56 to operate a single switch mechanism 51. The switch mechanism consists of the contact 75 carried on a pivoted lever 76 and the contact 77 carried on a pivoted lever 78. Springs 79 and 80 cooperate with the pivoted levers tending to rotate them in opposite directions. As long as the magnets 55 and 56 remain deenergized and armatures 82 and 83 are unattracted the pivoted armature supporting structures 88 and 89 coact with upstanding lugs 90 and 91 on the levers 76 and 77 respectively, to hold these levers downwardly against the actions of the springs 79 and 80, permitting the contacts 75 and 77 comprising one pair 51 to remain in engagement with each other. If only one magnet of this pair, for example the magnet 55, is energized, the attraction of its armature causes the pivoted structure 89 to release the lever 78 which moves clockwise under the action of spring 80, permitting the contacts 77 to disengage the contacts 75, opening pair 51 and interrupting the control circuit 50 at this point. If both corresponding magnets 55 and 56 are energized, however, both armatures 82 and 83 will be attracted and both levers 76 and 78 will be released thereby causing the contacts 75 and 77 to move upwardly together and remain in engagement thus maintaining the control circuit 50 closed. As long as the control perforations in the cards under the lower and upper brushes agree, it will be obvious that every magnet 56 is either energized or deenergized while its corresponding magnet 55 is likewise either energized or deenergized to maintain the contacts 51 closed. If the control perforations on the cards under the upper and lower brushes do not agree, non-agreeing combinations of magnets 56 and 55 will be energized thereby opening the control circuit 50 at one or more of the pairs of contacts 51.

Figure 2:
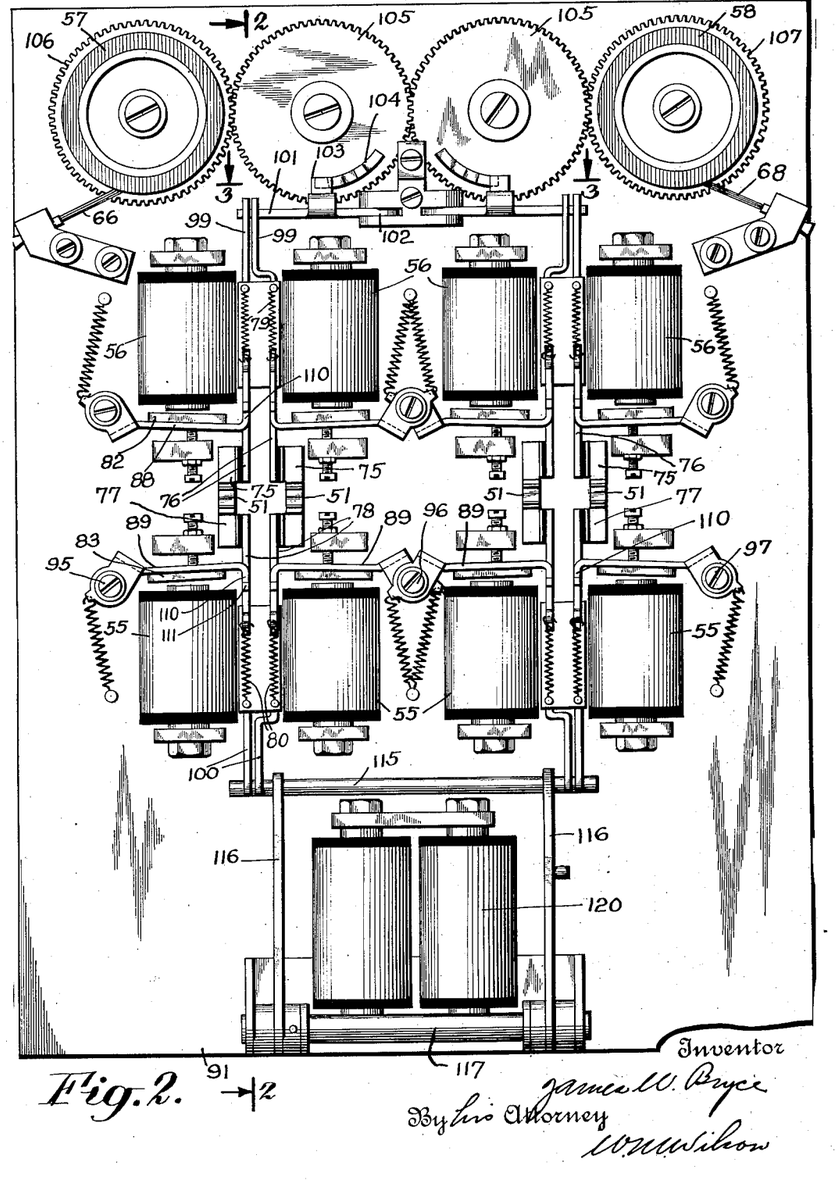
Fig. 2 is a plan view of a complete control unit for a single card column.
Figure 4:
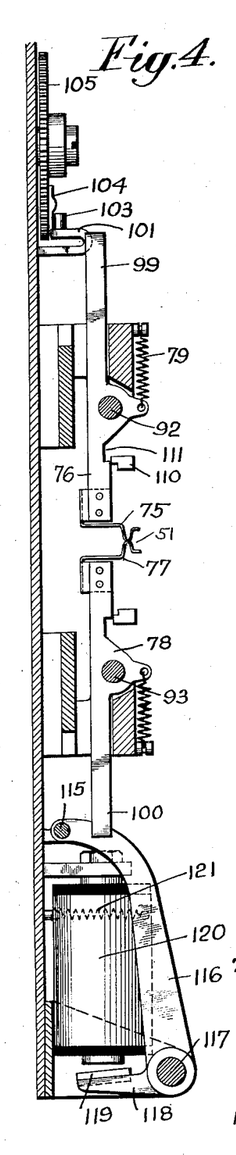
Fig. 4 is a section on line 2—2 of Fig. 2.
Figures 6, 7, 8:
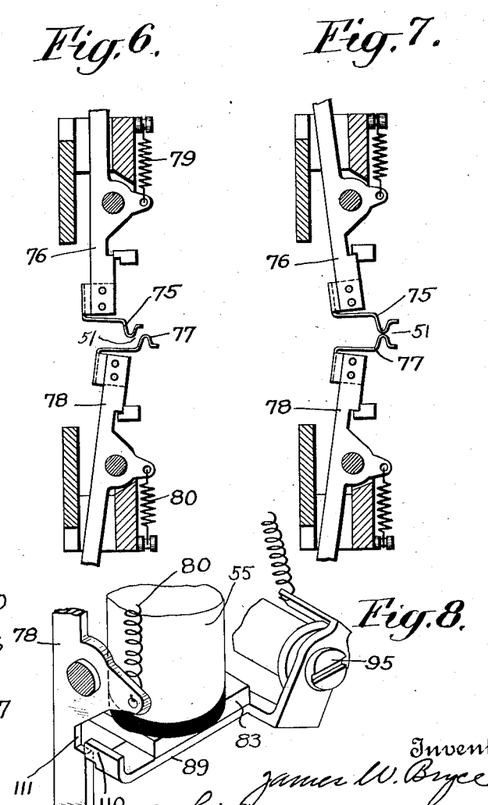
Figs. 6 and 7 are details of the switch mechanism showing the parts in different positions and Fig. 8 is a detail showing the latch mechanism controlled by one of the magnets for operating the switch mechanism.

Referring to Fig. 2, each unit which cooperates with a card column is mounted on a common base plate 91, the four magnets 55 being placed opposite the four magnets 56, and the pivoted levers 76 and 78 carrying the contacts 75 and 77 at their ends in proximity to each other and insulated from the levers. The contacts are bent toward each other as may be seen in Fig. 4 and are formed of resilient material to force the loop portions into engagement with each other when both levers are in corresponding positions. The supporting structures 89, Fig. 2, for the armatures 83 of magnets 55 are pivoted at points indicated at 95, 96 and 97, the pivot point 96 being common to the supporting structures of two of the magnet armatures. The supporting structure 89 is provided at its end opposite the pivot point 97 with an extension 110 which when the magnet is in unattracted position (see Fig. 8) rests against the edge of a notch 111 in the lever 78 and holds this lever from movement by the action of the spring 80. When the magnet 55 is energized to attract its armature 83 the structure 89 is rocked about its pivot releasing the lever 78 which is rotated slightly by the spring 80, the extension 110 in this case fitting into the notch 111; thus allowing the relative displacement of the contact 77 to the position shown in Fig. 6 and causing disengagement between the contacts 77 and 75. Energization of the co-operating magnet 56 in a similar manner causes displacement of lever 76, causing the contacts 75 and 77 to again engage as indicated in Fig. 7. Thus if corresponding magnets 55 and 56 of a pair are both energized, the contacts 75 and 77 remain in engagement; while if one is energized without concurrent energization of the other, the contacts 75 and 77 disengage.

Figure 5:
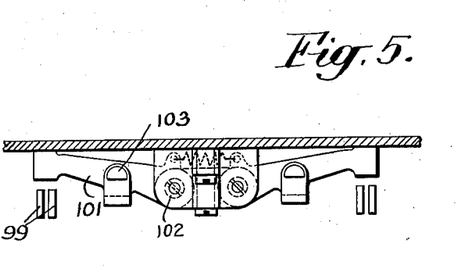
Fig. 5 is a section on line 3—3 of Fig. 2.

The levers 76 are provided with rearward extensions 99 which overlie a restoring member 101 pivoted at 102 (Figs. 2 and 5). Intermediate its ends this restoring member carries a pin 103 which cooperates with a cam 104 on gear 105. Gears 105 mesh with each other and with gears 106 and 107 rigid with the commutators 57 and 58, respectively. This entire gear train is driven from the operating shaft of the machine, by means not shown, so that the commutators 57 and the gears 105 carrying the cams 104 make one revolution for each card cycle of the machine. Once each card cycle, after the cam contacts C—1 (see Fig. 1) have opened and closed again, the cam 104, Fig. 2, engages the pin 103 and rocks the restoring member 101 about the pivot 102 whereupon its end restores the levers 76 to normal position, permitting them to be relatched by the extensions 110 on armature supporting structures 88. This restoring action occurs every card cycle to reset the levers 76 which are associated with the upper analyzing brushes 37 of the machine. That is, the levers 76 are separately set for each card which passes under the upper brushes.

The levers 78 which cooperate with the lower analyzing brushes need not be reset every cycle, however, because during the feeding of a card group, they may be left in the position into which they are set by the first card of the group. The restoring mechanism for the levers 78 is therefore made operative only at the end of a card group when a total is taken. This restoring mechanism consists of a bail 115 (Figs. 2 and 4) having portions underlying the rearward extensions 100 of the levers 78. The bail is carried by a pair of arms 116 fixed to a pivoted rod or shaft 117 to which is also fastened an arm 118 carrying the armature 119 of a magnet 120. A spring 121 normally holds the armature 119 away from the magnet, and the bail 115 out of engagement with the extensions 100 of the levers 78. During the total taking reset cycle, the magnet 120 is energized to attract the armature 119 and rock the arm 116 clockwise, as viewed in Fig. 4, causing the bail 115 to engage the extensions 100 of the levers 78 which were displaced during the preceding card group, restoring them to normal position and permitting them to be relatched by the supporting structures 89 of the magnets 55. The magnet 120 is energized by the closing of cam contacts P—10 (Fig. 1a) which are operated by a cam on shaft 205, Fig. 1, which is operated by the reset shaft 210 during total taking operations.

The invention has now been described in connection with a single embodiment to fully disclose its construction and operation. It will be understood, however, that the disclosure should be taken in an exemplary and not a limiting sense as many modifications will readily occur to those skilled in the art and I intend to be limited only as indicated by the scope of the following claims:

What is claimed is:

1. An automatic control system for record controlled machines including analyzing means for simultaneously analyzing a plurality of successive records, a plurality of devices one for each record simultaneously analyzed and individually settable under control of the analyzing means according to each record simultaneously analyzed, and means conjointly controlled by said devices after they have been set for differently controlling machine operation in accordance with simultaneous analyses of like and unlike records.

2. An automatic control system for record controlled machines including a first analyzing means and a second analyzing means for analyzing successive records, devices settable under control of one of the analyzing means according to the first record of a group, and devices settable under control of the other analyzing means for each subsequent record, and means conjointly controlled by said devices for modifying machine operation on a change of record group.

3. An automatic control system for record controlled machines including first analyzing means for analyzing successive records and second analyzing means for analyzing each record one cycle later, devices settable under control of said first analyzing means according to analyzed records and devices settable under control of said second analyzing means according to analyzed records, means controlled conjointly by said devices for governing machine operation in accordance with record groups, means for restoring the devices controlled by the first analyzing means after analysis of each record, and means for restoring the devices controlled by the second analyzing means only after a change in record group.

4. An automatic control system for controlling operation of a record controlled machine according to record groups comprising a first analyzing means and a second analyzing means for analyzing successive records, a first set of devices settable under control of one of the analyzing means according to analyzed records, a second set of devices settable under control of the other analyzing means according to analyzed records, means conjointly controlled by said sets of devices for governing machine operation in accordance with like and unlike settings of said devices, means for restoring one set of devices after each setting, and means for restoring the other set of devices only after analysis of unlike successive records.

5. An automatic control system for record controlled machines including record analyzing means for operating upon successive records, translating means controlled by the analyzing means for translating readings into combinational setups, and means controlled in accordance with like and unlike successive combinational setups for controlling machine operation.

6. An automatic control system for record controlled machines including record analyzing means for successively searching differentially located index point positions on successive controlling records, translating means controlled by the analyzing means for converting readings from differentially located index points into combinational setups, and means controlled in accordance with like and unlike successive combinational setups for controlling machine operation.

7. An automatic control system for record controlled machines including a first record analyzing means and a second analyzing means for analyzing successive records, a plurality of pairs of settable elements associated with each record column, means controlled by one of the analyzing means for setting one element of said pairs in combinations conforming to the first record of a group, means controlled by the other analyzing means for setting the other element of said pairs in combinations conforming to the subsequent records, and means controlled in accordance with like and unlike settings of the elements of said pairs to modify machine operation on a change in record group.

8. An automatic control system for record controlled machines including a first analyzing means for analyzing successive records and a second analyzing means for analyzing records one machine cycle later, a plurality of pairs of settable elements, one element of each pair being controlled by the first analyzing means according to analyzed records and the other element of each pair being controlled by the second analyzing means according to analyzed records, and means effective after the setting of said elements and controlled in accordance with like and unlike settings of the elements in said pairs to control machine operation.

9. An automatic control system for record controlled machines including analyzing means for successively analyzing index points in columns of controlling records, a plurality of magnets associated with the analyzing means of each record column and energized in combinations under control of the analyzing means according to index points, and means controlled by the magnets in accordance with like and unlike energizations of the same from successive records to control machine operation in different manners.

10. An automatic control system for record controlled machines including analyzing means for analyzing index points on successive records, a plurality of magnets and a commutator coacting with the analyzing means for controlling energization of said magnets in combinations according to index points on records, and means controlled by the magnets for modifying machine operation on energization of unlike combinations of said magnets from successive records.

11. An automatic control system for record controlled machines including analyzing means for analyzing index points on successive records of a group, a first set of magnets and a commutator coacting with the analyzing means for controlling energization of said magnets in combinations according to index points on the first record of a group, a second set of magnets and a commutator coacting with the analyzing means for controlling energization of the second set of magnets in combinations according to index points on subsequent successive records of a group, and means for modifying machine operation when the combination of energized magnets of the second set fails to agree with the combination of energized magnets of the first set.

12. An automatic control system for record controlled machines including analyzing means for analyzing index points on successive records, a plurality of switches each including a pair of movable switch elements for controlling machine operation in one way when the relative positions of the movable elements of each pair agree, and in another way when the relative positions of the movable elements of one or more pairs disagree, electromagnetic devices for operating the movable elements, and commutator mechanism coacting with the analyzing means for operating the electromagnetic device to change the relative positions of some of the movable elements when index points on successive records fail to agree.

13. An automatic control system for record controlled machines including analyzing means for analyzing index points on successive records, a control circuit including a switch having two contacting elements relatively movable with respect to each other to open and close the circuit, electromagnetic means controlled by the analyzing means for operating the switch to effect displacement of one element with respect to the other when successive records fail to agree and to effect equal displacement of both elements to maintain the contact between them when successive records agree.

14. An automatic control system for record controlled machines including a first record analyzing brush and a second record analyzing brush with means for feeding successive records past said brushes successively with a continuous motion, a commutator associated with each brush rotatable synchronously with the record feed, each of said commutators having groups of contacts located in accordance with index point positions on controlling records, a set of magnets associated with each commutator, commutator brushes coacting with the contacts and connected with the magnets to energize different combinations of the latter for different index points, and means conjointly controlled by the sets of magnets to control machine operation in one way when the energized combinations agree and in another way when the energized combinations disagree.

15. An automatic control system for record controlled machines including analyzing mechanism for analyzing successive records and means for feeding records past said analyzing mechanism with a continuous motion, commutator mechanism rotatable synchronously with record feed and having a plurality of contacts connected to the analyzing mechanism arranged in groups corresponding in location with the location of index points on the records, a plurality of brushes cooperating with said contacts and a magnet connected to each brush, and means controlled by the magnets according to like and unlike index points on successive records for differently controlling machine operation.

In testimony whereof I hereto affix my signature.

JAMES W. BRYCE.